(12) United States Patent
Ficet et al.

(10) Patent No.: US 11,258,687 B2
(45) Date of Patent: Feb. 22, 2022

(54) METHOD FOR GENERATING REQUESTS FOR THE SEGMENTATION OF THE MONITORING OF AN INTERCONNECTION NETWORK AND ASSOCIATED HARDWARE

(71) Applicant: BULL SAS, Les Clayes-sous-Bois (FR)

(72) Inventors: Jean-Vincent Ficet, La Chapelle Blanche (FR); Sébastien Dugue, Saint Theoffrey (FR); Marek Schimara, Vinay (FR)

(73) Assignee: BULL SAS, Les Clayes-sous-Bois (FR)

(*) Notice: Subject to any disclaimer, the term of this patent is extended or adjusted under 35 U.S.C. 154(b) by 22 days.

(21) Appl. No.: 16/924,840

(22) Filed: Jul. 9, 2020

(65) Prior Publication Data
US 2020/0344141 A1 Oct. 29, 2020

Related U.S. Application Data

(62) Division of application No. 16/144,064, filed on Sep. 27, 2018, now Pat. No. 10,749,776.

(30) Foreign Application Priority Data

Oct. 10, 2017 (FR) ..................................... 1759486

(51) Int. Cl.
*H04L 15/16* (2006.01)
*H04L 43/0817* (2022.01)
(Continued)

(52) U.S. Cl.
CPC ...... *H04L 43/0817* (2013.01); *G06F 11/3055* (2013.01); *H04L 41/12* (2013.01); *H04L 49/3009* (2013.01); *H04L 49/15* (2013.01)

(58) Field of Classification Search
CPC . H04L 43/0817; H04L 49/3009; H04L 49/15; H04L 41/12
(Continued)

(56) References Cited

U.S. PATENT DOCUMENTS

| | | |
|---|---|---|
| 5,914,937 A | 6/1999 | Arnold |
| 6,049,529 A | 4/2000 | Brimmage et al. |

(Continued)

OTHER PUBLICATIONS

European Search Report issued in corresponding European Application No. 18198968.2 dated Feb. 13, 2019, 10 pages.

*Primary Examiner* — Moustafa M Meky
(74) *Attorney, Agent, or Firm* — Arc IP Law, PC; Joseph J. Mayo

(57) ABSTRACT

The invention relates to a method for generating a request, from a formal language instruction defining a set of ports of an interconnection network, said request including an addressing command for each one of the ports defined in the instruction, said method including the following steps:
  Receiving, by a communication module, a formal language instruction defining a set of ports,
  Processing, by a processing module, the formal language instruction so as to generate a set of numbers encoded on at least one byte, each number including position bits, each one of the position bits allowing to identify a port and at least one authorization bit, the at least one authorization bit allowing to define access rights on the ports, and
  Encoding, by an encoding module, the set of numbers so as to generate the request including the addressing command.

12 Claims, 6 Drawing Sheets

Figure 1:
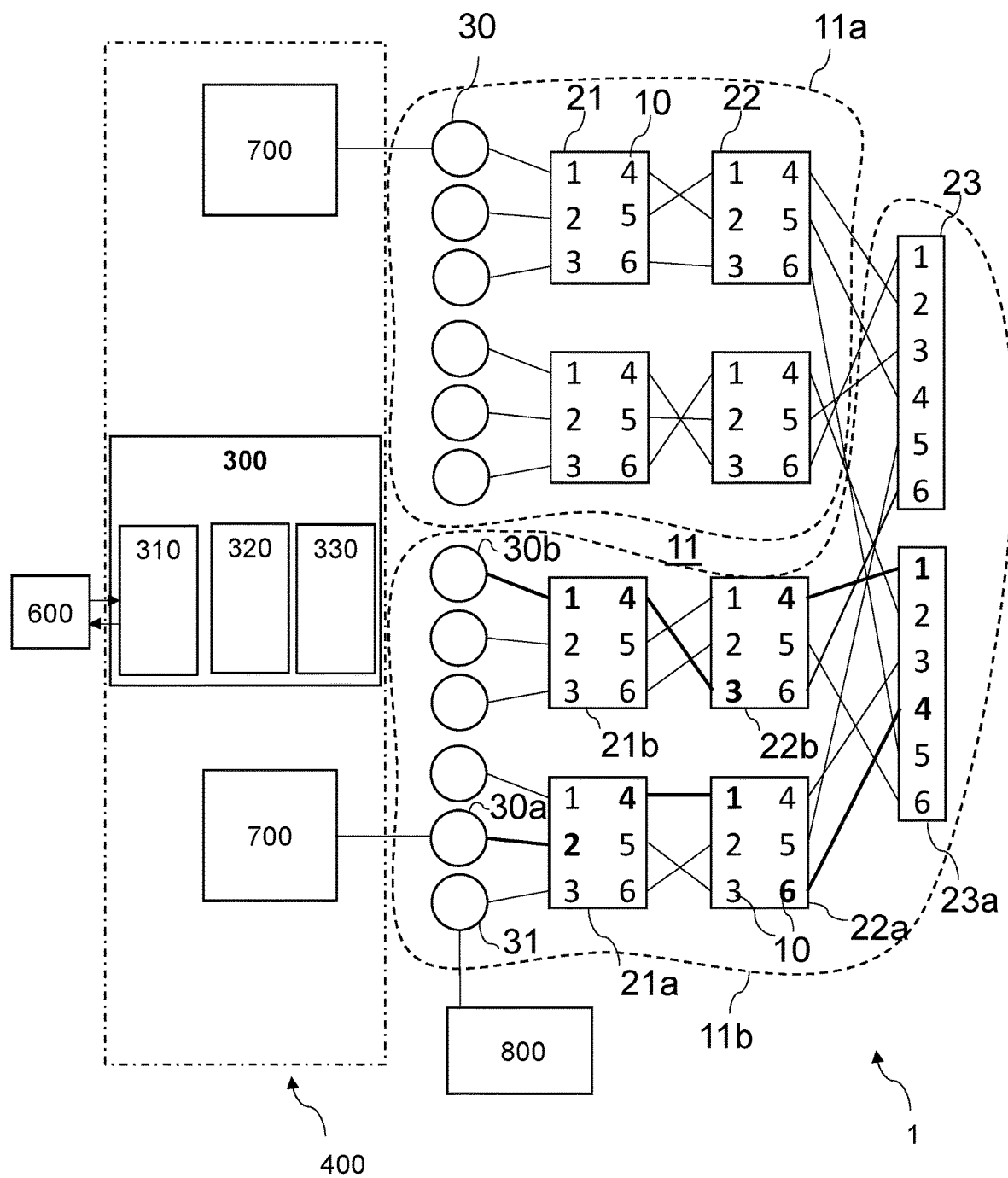

(51) Int. Cl.
  *H04L 41/12* (2022.01)
  *G06F 11/30* (2006.01)
  *H04L 49/00* (2022.01)
  *H04L 49/15* (2022.01)

(58) Field of Classification Search
  USPC .......................................................... 709/224
  See application file for complete search history.

(56) References Cited

U.S. PATENT DOCUMENTS

| | | |
|---|---|---|
| 6,212,607 B1 * | 4/2001 | Miller .................. G11C 7/1075 |
| | | 365/189.16 |
| 6,393,483 B1 | 5/2002 | Latif et al. |
| 6,742,089 B1 * | 5/2004 | Inoue .................. G06F 13/1647 |
| | | 711/149 |
| 7,697,526 B2 | 4/2010 | Ambe et al. |
| 9,742,798 B2 | 8/2017 | Thubert et al. |
| 10,218,524 B2 | 2/2019 | Wijnands et al. |
| 10,379,160 B2 * | 8/2019 | Buckett .......... G01R 31/318536 |
| 2003/0033427 A1 | 2/2003 | Brahmaroutu |
| 2004/0032869 A1 | 2/2004 | Ambe et al. |
| 2006/0182118 A1 * | 8/2006 | Lam ........................ H04L 47/13 |
| | | 370/395.42 |
| 2006/0227770 A1 | 10/2006 | Jakubik et al. |
| 2009/0190598 A1 | 7/2009 | Christensen et al. |
| 2009/0196289 A1 | 8/2009 | Shankar et al. |
| 2015/0237007 A1 | 8/2015 | Liu et al. |
| 2018/0067165 A1 * | 3/2018 | Buckett .......... G01R 31/318536 |

* cited by examiner

METHOD FOR GENERATING REQUESTS FOR THE SEGMENTATION OF THE MONITORING OF AN INTERCONNECTION NETWORK AND ASSOCIATED HARDWARE

CROSS-REFERENCE TO RELATED APPLICATION

This application is a divisional of U.S. application Ser. No. 16/144,064 filed Sep. 27, 2018, the contents of which are incorporated herein by reference.

BACKGROUND

The invention relates to the field of network monitoring, and more particularly to the generation of computer requests that can be used in particular in monitoring equipment of an interconnection network. The invention provides a request generation method, the device for generating such requests, a monitoring system incorporating this device, as well as a monitoring method implementing this system.

PRIOR ART

High Performance Computing, also known as HPC (High Performance Computing in Anglo-Saxon terminology), is developing for both academic research and industry, especially in technical fields such as aeronautics, energy, climatology and life sciences. These calculations are generally implemented on interconnection networks called clusters. The purpose of these clusters is to overcome the limitations of existing hardware by pooling resources to allow parallelized execution of instructions and disk and memory aggregation.

A cluster, also called an interconnection network, is a set of interconnected computing means (also called nodes) that can perform common operations. Clusters consist of a large number of nodes (typically several thousand), the latter being interconnected, for example hierarchically, by switches (typically several hundred), called switch in Anglo-Saxon terminology. The networks thus formed may comprise several tens of thousands of ports. Each node is for example a server, a computer or more generally a machine.

The size of clusters increases day by day. For controlling and maintaining computing clusters in operational condition, network management softwares must not only be able to process large volumes of data, but also be able to trace anomalies quickly. Thus, monitoring and controlling a cluster, particularly switches, are typically performed centrally via a dedicated node, called the administration node. A network manager (also called a "Subnet Manager") can monitor the network via this administration node. The network manager can also use subnet management agent (SMA—Subnet management agent in Anglo-Saxon terminology) associated with each switch. The SMAs communicate changes, such as new connections, disconnections, and port state change to the network manager (see "Infiniband™ Architecture Volume 1 Release 1.3"). In addition, since a hardware failure in one of the switches or nodes has a direct influence on the performance of a cluster, it is also necessary to monitor the operating state of the hardware in a cluster in order to, where appropriate, alert an administrator of a potential hardware problem.

Nevertheless, such monitoring of a cluster, and in particular hardware failures, requires handling large volumes of data generated by thousands of nodes and switches. One possibility for reducing resource consumption while providing more efficient monitoring is to divide the network into several disjoint sets, each of which being monitored by a dedicated software entity. Thus, there are methods for the segmentation (or partial discoveries) of an interconnection network. Thus, in order to subdivide the networks, the network managers can use routing tables calculated when initializing the network. These tables can include identifiers of the LID (Local Identifier in Anglo-Saxon terminology) type, but in this case all the ports of a same switch share the same LID or identifiers of the GID (Global Identifier in Anglo-Saxon terminology) type consisting of a prefix and a GUID (Global unique identifiers in Anglo-Saxon terminology) port identifier. To ensure optimal performance, the routing tables must be recalculated whenever the topology changes or when significant failures occur. Another solution is to set up unique management keys of the PKey (Partition Key) type. Nevertheless, the different ports of two partitions are not able to work together on a same issue. Thus, existing solutions result in a reduction of the scale of the interconnection network or require the use of routing tables.

In clusters (and particularly the Infiniband or Omnipath systems, Infiniband and OmniPath are also trademarks), the indications defining a path between a given piece of equipment and a reference piece of equipment are called direct route paths (Direct Route Path in Anglo-Saxon terminology). The reference piece of equipment is typically an administration node. Depending on the topology of the IT infrastructure, there may be multiple direct route paths between a given piece of equipment and a reference piece of equipment. In other words, a direct route path describes the successive links that a packet of data sent by the reference piece of equipment must use to reach a given piece of equipment. It is expressed as a suite of switch output port references that the packet must use to reach its destination. Direct route paths between a reference piece of equipment and other equipment are typically established when discovering the basic infrastructure by the network manager. Such a discovery typically uses conventional tree exploration algorithms. Nevertheless, the use of a direct route path set for targeting a set of ports would be a tedious work consuming a significant time since the definition of a set of ports may require thousands of command lines of the direct route type.

Thus, there is a need for new methods capable of quickly creating non-disjoint interconnection network subsets and that can be monitored by separate units without redundancy so as to allow for a rapid monitoring of large volumes of data.

Technical Problem

The invention therefore aims to overcome the disadvantages of the prior art. In particular, the object of the invention is to provide a method capable of rapidly subdividing an interconnection network into several sets of ports, corresponding to portions of the interconnection network, for entrusting the monitoring to several independent units, each taking care of a portion of the network.

The invention also aims to provide a monitoring system, more particularly for monitoring hardware failures, of an interconnection network capable of independently tracking several sets of ports of the interconnection network.

Brief Description of the Invention

To this end, the invention relates to a method for generating a request, from a formal language instruction defining a set of ports of an interconnection network, said request including an addressing command for each one of the ports defined in the instruction, said method including the following steps:

receiving, by a communication module, a formal language instruction defining a set of ports, processing, by a processing module, the formal language instruction so as to generate a set of numbers encoded on at least one byte, each number including position bits, each one of the position bits allowing to identify a port and at least one authorization bit, the at least one authorization bit allowing to define access rights on the ports, and encoding, by an encoding module, the set of numbers encoded on at least one byte so as to generate the request, said request including the addressing command for each port of the set of ports of the interconnection network.

Thus, the present invention allows to generate a request capable of establishing an addressing towards a plurality of ports. This request can be used for segmenting an interconnection network (of the InfiniBand or OmniPath type) into several smaller sets. This method allows to generate from a simple formal instruction a set of several thousand addressing commands so as to target only the set of desired ports. Such a request can for example be used to set up a targeted monitoring of a portion of an interconnection network via distributed monitoring devices. Indeed, preferably, the set of ports defined by the formal language instruction corresponds to a restricted perimeter of the interconnection network.

The method implements a set of numbers encoded on at least one byte. Thus, it is not necessary to set up or manage routing tables which are heavier in terms of memory than a series of numbers. The information for establishing the links between switch ports and nodes is usually stored in routing tables and/or in a configuration database of the IT infrastructure. Here, the use of a direct route path allows to dispense with the use of such routing tables. This method therefore allows to define in a simple and compact manner a set of routes through which the exploration of the network is authorized. In doing so, defining sets that can be monitored by dedicated software entities is easy. A network discovery implementing the rules defined by this method can then be performed.

According to other optional features of the method:

the interconnection network includes a plurality of levels and the set of numbers encoded on at least one byte includes at least one number encoded on at least one byte for each level of the interconnection network. Preferably, it includes between one and four numbers encoded on at least one byte for each level of the interconnection network. More preferably, it includes a single number encoded on at least one byte for each level of the interconnection network. Thus, all the ports of a level are managed with a limited amount of encoded numbers, thus occupying a very reduced memory space especially in comparison with partition keys or routing tables.

the set of numbers includes between two and sixteen numbers encoded on at least one byte. In addition, the numbers encoded on at least one byte are preferably numbers encoded on four to eight bytes, even more preferably on eight bytes. Thus, it is not necessary, in the context of the method according to the invention, to assign a key to all the ports constituting the interconnection network, nor to implement complex routing tables. Only a few numbers each representing only a few bytes for defining a set of ports of an interconnection network including thousands of ports, are needed.

the formal language instruction includes a plurality of numbers and symbols and the processing step includes the following substeps: parsing the instruction into formal language, comparing each symbol of the formal language instruction sequentially with a stored list for segmenting the instruction into a plurality of portions, each portion corresponding to a level of the interconnection network, transforming each portion into a number encoded on at least one byte, storing each one of the numbers encoded on at least one byte, and aggregating the numbers encoded on at least one byte so as to form a set of numbers encoded on at least one byte. Such a transformation step is simple to implement. A plurality of numbers corresponds to several numbers and in this case, a number may preferably correspond to the number of a port of the interconnection network.

during the encoding step the position of one of the position bits in the number encoded on at least one byte is indicative of a port number while the value of this position bit is indicative of whether said port is taken into account when establishing the request. Thus, all the ports of a switch can be taken into account with one and the same number. In addition, a same number may advantageously be applied to all the switches of a same level. A port of a switch that is taken into account will be a port on which an action will be performed following the addressing request. In the context of a monitoring method, taking into account will consist for example in the port being traversed and monitored (e.g. bit value=1).

during the encoding step the values of the position bits allow to define one or more ports concerned which will be taken into account when establishing the request and the value of the at least one authorization bit allows to define whether the one or more ports concerned will be the subject of a destination by an addressing command or whether they will only be traversed. The possibility offered by the addressing request according to the invention of taking into account a port (via the value of the position bits) or not allows to be able to initiate actions on specifically only a part of the ports while the value of the authorization bit allows to define whether the ports taken into account will be the object of a destination by an addressing command or whether they will only be traversed. Preferably, the number encoded on at least one byte includes an authorization bit.

The invention also relates to a request generating device configured to generate, from a formal language instruction defining a set of ports of an interconnection network, a request including an addressing command for each one of the ports defined in the formal language instruction, said device including:

a communication module able to receive a formal language instruction defining a set of ports, a processing module able to process the formal language instruction so as to generate a set of numbers encoded on at least one byte, each number including position bits, each one of the position bits allowing to identify a port and at least one authorization bit, the at least one authorization bit allowing to define access rights on the ports;

an encoding module able to encode the set of numbers encoded on at least one byte so as to generate a request, said request including the addressing command for each port of the set of ports of the interconnection network.

Advantageously, the request generating device according to the invention is able to receive the instruction from a client device and send the request to a system for monitoring an interconnection network.

The invention further relates to a system for monitoring an interconnection network including a device according to the invention. Such a system could allow to monitor the network in a shorter time while requiring fewer resources than for a comprehensive monitoring of all the network by a single unit. Moreover, the benefits conferred by this system increase with the size of the network.

The invention further relates to a method for monitoring an interconnection network implementing a monitoring system according to the invention, said monitoring method including the following steps:

Receiving, preferably by the request generating device, a formal language instruction defining a set of ports corresponding to a restricted perimeter of the interconnection network, Generating, preferably by the request generating device, from the formal language instruction, a request including an addressing command for each one of the ports defined in the formal language instruction, Transmitting, preferably by the request generating device, the request to a restricted perimeter monitoring module able to receive hardware statuses of the set of ports of the restricted monitoring perimeter, Requesting hardware status values by the monitoring module with the ports corresponding to the restricted perimeter of the interconnection network, Receiving the hardware status values by the monitoring module, and Storing hardware status values by the monitoring module.

Such a method for monitoring an interconnection network allows in particular to involve only a portion of the ports of the network and in particular, the ports corresponding to the restricted perimeter of the interconnection network. This is especially possible thanks to the generation of an addressing request according to the invention.

Advantageously, the monitoring method further comprises the following steps:

receiving hardware status values, preferably by the monitoring system according to the invention, from a plurality of restricted perimeter monitoring modules, and storing the hardware status values, and aggregating the hardware status values from a plurality of monitoring modules.

The present invention relates to a device and a method for segmenting an interconnection network into several smaller subsets in order to be able to set up distributed monitoring devices.

At least one of the hardware statuses is selected from: the state of the power supply, the board voltage values, the internal temperatures, the state of the fan, the environmental and operational data of the display, and the software versions (firmware in Anglo-Saxon terminology) of the switch.

In another aspect, the invention also relates to a computer-readable medium having a program code stored thereon which, when executed by a machine, causes the machine to perform the request generation method and/or the monitoring method according to the invention.

Other advantages and characteristics of the invention will appear upon reading the following description given by way of illustrative and non-limiting example, with reference to the appended figures which represent:

FIG. 1, an example of the topology of a cluster associated with a monitoring system according to the invention.

Figure 2:
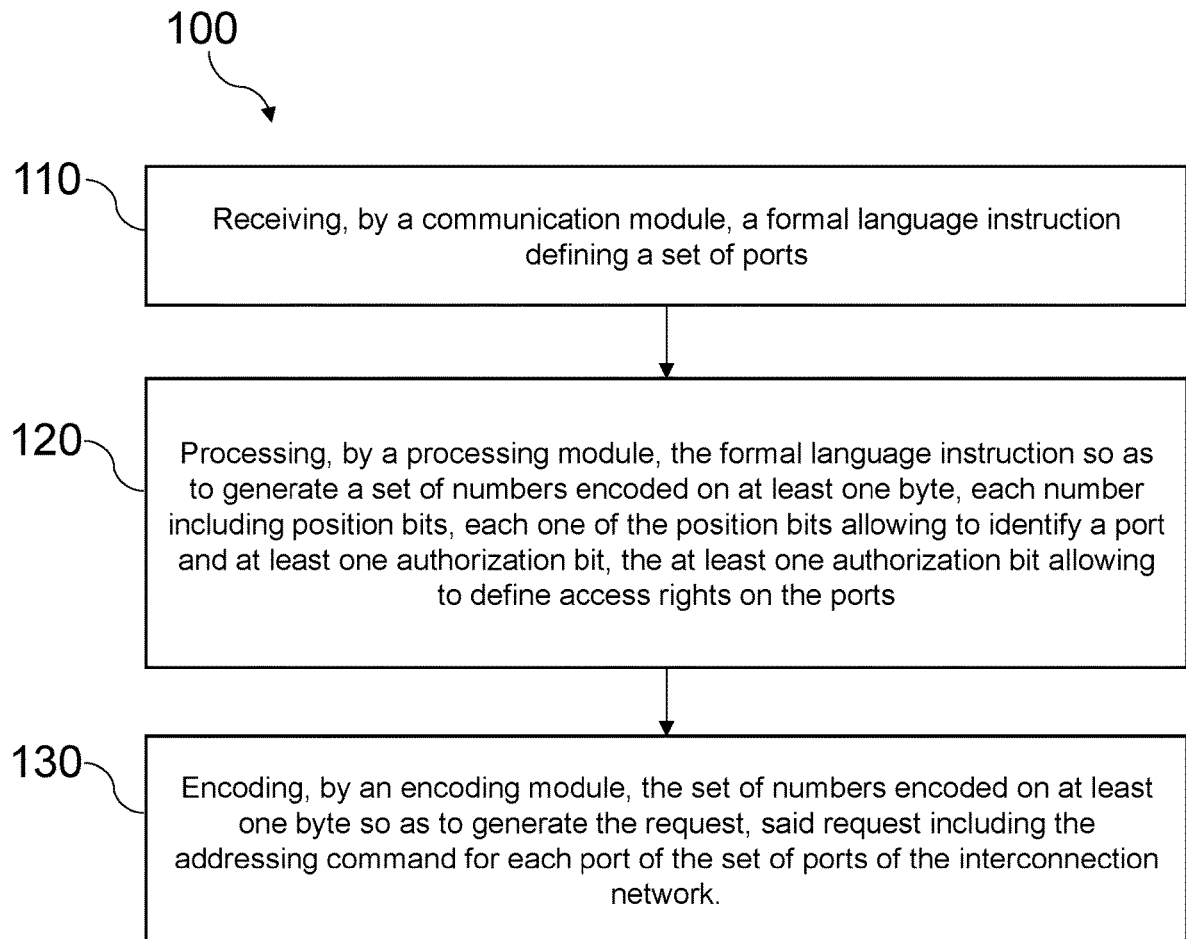

FIG. 2, a schematic representation of a request generation method according to the invention.

Figure 3A:
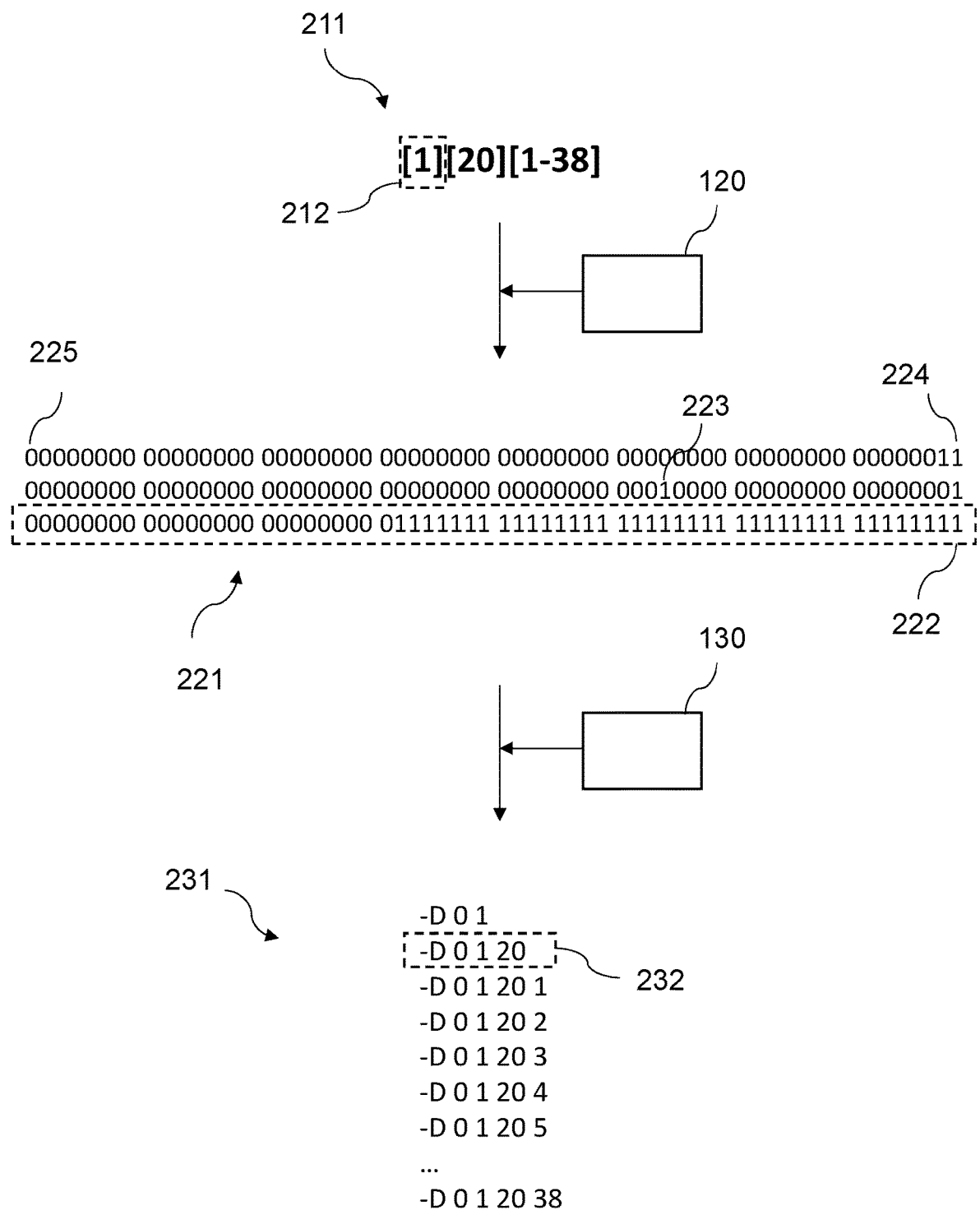
Figure 3B:
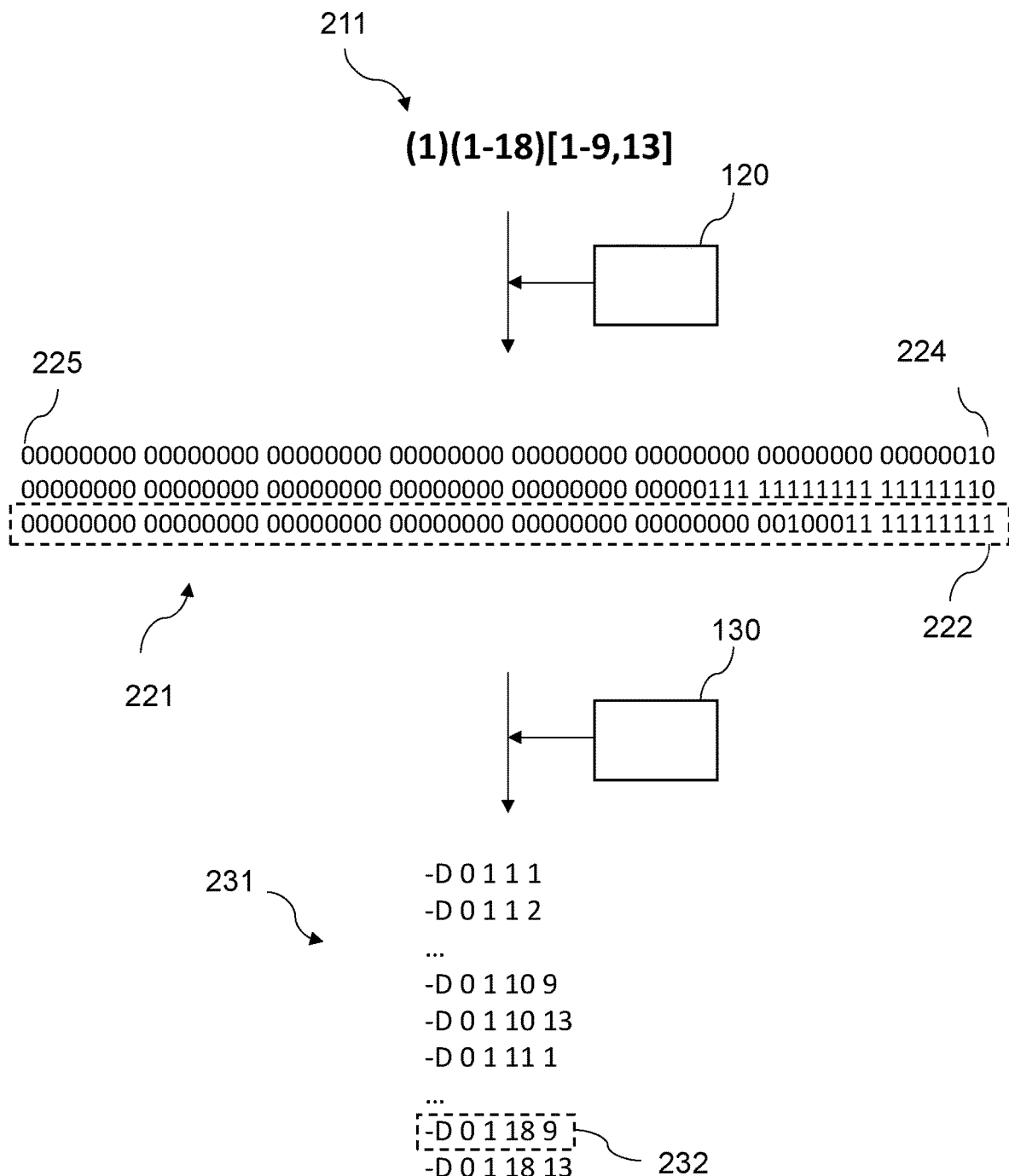

FIGS. 3A and 3B, schematically, a sequence of transformations according to the generation method according to the invention for transforming a formal language instruction designating a set of ports, into a request including the addressing command for each port of the set of ports.

Figure 4:
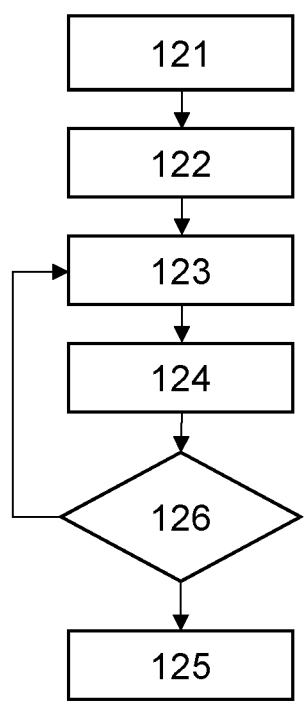

FIG. 4, a schematic representation of certain steps implemented according to the invention when processing the formal language instruction.

Figure 5:
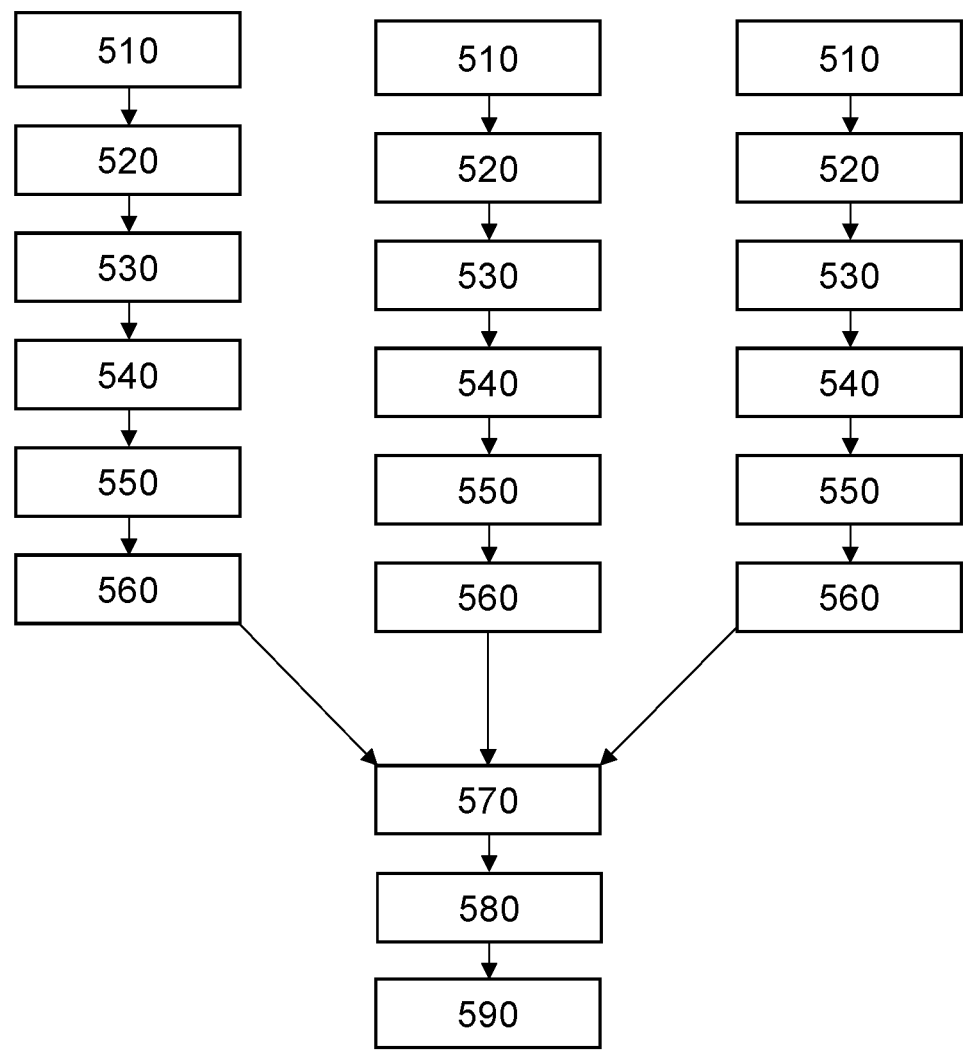

FIG. 5, a schematic representation of certain steps implemented according to the invention during the monitoring method.

DESCRIPTION OF THE INVENTION

In the following description, by "formal language text" or "formal language", within the meaning of the invention, is meant a textual data structured by a data model that is predefined or organized in a predefined manner. The formal language text is not a computer code, but respects a certain form allowing its interpretation by the request generator. The form to be respected may be freely selected during the configuration of the request generator according to the invention.

By "configuration file", within the meaning of the invention, is meant a file comprising the information required for implementing the method according to the invention. The files are accessible to the various modules of the devices and systems according to the invention.

The expression "access to a configuration file", within the meaning of the invention, corresponds to the actions required to access a file on a local storage medium, or by downloading it or by direct broadcasting (streaming), from a remote storage, via a web protocol or access to a database. This is usually an access path to the file possibly preceded by an access protocol (such as http://, file://).

The terms or expressions "application", "software", "program code", and "executable code" mean any expression, code or notation, of a set of instructions intended to cause a system data processing to perform a particular function directly or indirectly (e.g. after a conversion operation to another code). Program code examples may include, but are not limited to, a subprogram, a function, an executable application, a source code, an object code, a library and/or any other sequence of instructions designed for being performed on a computer system.

The expression "human-machine interface", within the meaning of the invention, corresponds to any element allowing a human being to communicate with a computer, in particular and without being exhaustive, a keyboard and means allowing in response to the commands entered on the keyboard to perform displays and optionally to select with the mouse or a touchpad items displayed on the screen.

By "maximum predetermined threshold", within the meaning of the invention, is meant a maximum value of hardware statuses associated with each port, switch or node for a good operation of the hardware. For example, this corresponds to the maximum acceptable temperature limits. These limits can be real or hypothetical and generally correspond to a level beyond which malfunctions can occur and resulting in a shutdown of the hardware, a decrease in the service life of the equipment or at the very least decreases in service quality.

The term "malfunction", within the meaning of the invention, corresponds to the occurrence of a hardware incident or congestion on the interconnection network.

The expression "number encoded on at least one byte" refers to a number, multiplet of 8 bits or more. This number, as is generally the case for multiplets of 8, can encode information.

In the following description, the same references are used to designate the same elements.

Generally, in the context of setting up an interconnection network, when initializing, a network manager 800, for the management of the interconnection network, starts a discovery phase where it performs, via an administration node 31, a scan of the interconnection network in order to discover all the switches and nodes. Then, the network management module proceeds to the assignment of identifier for example of the LID- or GID-type, the configuration of the switches, the calculations of a routing table and the configuration of the ports. At this point, an interconnection network 1 is ready and ready for use. Once the network is configured, the network manager can monitor any changes on the interconnection network (e.g. a device is added or a link is deleted). The nodes are connected to each other by switches (called switch in Anglo-Saxon terminology), for example hierarchically.

In the example illustrated in FIG. 1, the interconnection network 1 comprises here a set of referenced nodes 30, including an administration node 31, as well as switches 21, 22, 23. Each switch here has six bidirectional ports numbered 1 to 6. The nodes 30 are connected to first level switches 21 which are themselves connected to second level switches 22 which are in turn connected to third level switches 23. The switches 20, that is to say 21, 22 and 23, route messages from their sources to their destinations, especially according to routing tables programed when initializing the interconnection network. For these purposes and as shown in FIG. 1, a port 10 is generally associated, in each switch 20, with one or more destinations.

The switches 21 are each connected to three different nodes. The switches 21 are also connected to the switches 22. Thus, each node is connected here to each one of the other nodes via at most five switches. By way of illustration, the node 30a is connected to the node 30b via the switches 21a, 22a, 23a, 22b and 21b. More precisely, the output port 1 of the node 30a is connected to the port 2 of the switch 21a, the port 4 of which is connected to the port 1 of the switch 22a, the port 6 of which is connected to the port 4 of the switch 23a, the port 1 of which is connected to the port 4 of the switch 22b, the port 3 of which is connected to the port 4 of the switch 21b, the port 1 of which is connected to the input port of the node 30b. An example of an addressing command according to the direct routes would be in this case a command of the type:

-D 0 1 4 6 1 3 1

According to one embodiment a client 600 can access the request generator 300. For example, the addressing command generator 300 may be implemented as a "front end" which can be accessed by clients for generating requests from formal language text entries. In the example shown in FIG. 1, a client 600 accesses the addressing command generator 300. For example, the client may execute a client application that is configured to communicate with the request generator 300. The client application may be a browser or another client-based communication application. In response to the access by the client 600, the request generator 300 can generate a user interface that can be sent to the client 600.

In addition, the interconnection network 1 shown in FIG. 1 is associated with two monitoring modules 700, each of which takes care of a portion of the interconnection network. Said portions 11a, 11b of the interconnection network consisting of a set 11 of ports.

FIG. 2 is a flowchart illustrating an example of a request generation method according to the invention. This method allows the generation of a request 231 including an addressing command 232 for each one of the ports 10 defined by a formal language instruction 211. The request may be more particularly a computer language request, and preferably it is a request including a plurality of direct route commands 232.

As shown in FIG. 2, the method includes a step 110 for receiving a formal language instruction 211 defining a set 11 of ports.

The formal language instruction 211 defines a set 11 of ports of an interconnection network. This set 11 of ports of an interconnection network may comprise several thousand ports. Preferably, the set of ports defined by the formal language instruction corresponds to a restricted perimeter, or a portion, of the interconnection network. These sets of ports are shown in FIG. 1 by the sets 11a and 11b where each set includes a plurality of computing nodes associated with a plurality of switches 20 including numerous ports. Thus, the computing nodes 30 belonging to two different sets are able to communicate with each other unlike the ports including different partition keys or managed by different network managers.

As mentioned above, this instruction can be received by a communication module 310. The method 100 may begin in a state where a user, using a client device, has accessed the request generation device 300 according to the invention. The device 300 may provide a user interface on the client device 600. As a result, the user is able to enter the formal language instruction in a user interface. The client device sends the formal language instruction 211 to the device 300 for processing and generating requests.

The formal language instruction 211 may include numbers and symbols. The objective being that this instruction is quickly generated by a user and that it includes all the information to enable the request generation device 300 to generate the potential thousands of direct route addressing commands for reaching the set of desired ports.

By way of example, the formal language may use the following conventions:

Operator '[': Beginning of the list of ports to be monitored,

Operator ']': End of the list of ports to be monitored,

Operator '(': Beginning of the list of ports to be traversed without monitoring, Operator ')': End of the list of ports to be traversed without monitoring, Operator '-': Specifies an interval, and Operator ',': Concatenation.

The interpretation conventions of the symbols presented above are by way of example only and while remaining within the scope of the invention, certain symbols may be modified and symbols having new functions may also be added. The symbols may also correspond to logical operators.

FIG. 3A shows for example a formal language instruction such as:

[1][20][1-38]

Such a formal language instruction was written by the user to describe the following behavior:

[1]: The packets exit port #1 while monitoring it (collecting data for that port). They now arrive into a switch 21.

[20]: The packets are allowed to traverse only port 20 and to collect data thereon. No packet is allowed to exit through ports other than port 20. The packets allowed to traverse reach a set of switches 22.

[1-38]: The packets are allowed to traverse the set of switches 22 through ports 1 to 38 and to collect data thereon. With [1-38], 38 theoretical ports are possible, in particular it is possible to have on the switch a smaller number of ports with a physical existence.

For clarity and conciseness reasons, the virtual port #0 of the implementations of direct route path of the InfiniBand and OmniPath protocols may not appear in the formal language instruction.

FIG. 3B shows another example of a formal language instruction such as:

(1)(1-18)[1-9,13]

Such a formal language instruction was written by the user to describe the following behavior:

(1): The packets exit port #1 without monitoring it (no data is collected for this port). They now arrive into a switch 21.

(1-18): The packets are allowed to traverse ports 1 to 18 of switch S, with no data being collected thereon. No packet is allowed to exit through ports not listed in this interval. The packets allowed to traverse reach a set of switches 22.

[1-9,13]: The packets are allowed to traverse the set of switches 22 through ports 1 to 9 and 13 and to collect data thereon.

The method 100 according to the invention also includes a step 120 for processing the formal language instruction 211 so as to generate a set 221 of numbers 222 encoded on at least one byte. This step can be implemented by a processing module 320.

As shown in FIG. 3A, each one of the numbers 222 includes position bits 223 for identifying ports. Particularly in FIG. 3A, the position bit 223 pointed at is the port #20 of the second number encoded on at least one byte. The position of one of the position bits in the number 222 encoded on at least one byte is indicative of a port number. Thus, a part of the bits advantageously corresponds to the switch port numbers. For example, as mentioned, the position bit 223 pointed at is the port #20.

With reference to FIGS. 3A and 3B, the leftmost bit in the diagram is bit #63 corresponding to a possible port #63 and the rightmost bit is bit #0 corresponding to an authorization bit. Thus, each number 222 also includes at least one authorization bit 224 for defining access rights on the ports. For example, in FIG. 3A, the authorization bit 224 pointed at is the authorization bit of the first number encoded on eight bytes. In this example, there is an authorization bit for specifying whether the port selected via the position bits is to be traversed and monitored (bit value 1) or only traversed (bit value 0).

The numbers 222 encoded on at least one byte may advantageously be encoded on at least four bytes, preferably they are encoded on eight bytes. Thus, the encoded number 222 may also comprise unused bits 225. Indeed, in FIG. 3A, the number 222 is encoded on eight bytes, namely 64 bits. Since a switch 20 of an interconnecting network may comprise less than 63 ports, then it is likely that the number 222 is not fully utilized.

FIG. 4 shows a flowchart of a processing step according to the invention. In this case, the processing step includes a first step 121 for parsing the instruction 211 into formal language. This allows to identify the symbols that may be present in the instruction and also to identify the ranges of ports concerned.

In particular, each symbol of the formal language instruction 211 is sequentially compared 122 to a stored list of symbols for segmenting the instruction 211 into a plurality of portions 212. Each portion 212 advantageously corresponds to a level of the interconnection network 1. The symbol list can be stored in a configuration file. With reference to FIG. 3B, the identified portions would be (1) and (1-18) and [1-9,13].

Once the portions are identified, there is a transformation 123 of each portion 212 into a number 222 encoded on at least one byte. For example, FIG. 3B shows three numbers encoded on eight bytes. Once generated, a number 222 encoded on at least one byte is stored 124 on a memory.

In the context of the method, there can then be a step 126 for verifying that all the portions 212 have been transformed into a number encoded on at least one byte. If that is not the case, the process is repeated from step 123 and the non-transformed portion undergoes the transformation step 123.

Finally, there is an aggregation 125 of the numbers 222 encoded on at least one byte so as to form a set 221 of numbers encoded on at least one byte. This step for aggregating the numbers encoded on at least one byte so as to form a set of numbers encoded on at least one byte allows to group numbers into a set of numbers. The aggregation allows to group the numbers so that they can be processed together. Several ways and many possibilities are known for grouping numbers into a set of numbers. This aggregation may for example correspond to storage on a same file, to a list, to a concatenation, to an indexing under the same literal.

During a step for processing a new instruction, so as to further accelerate the generation of a request, the method according to the invention may further includes a step for comparing each portion to portions stored on a memory. If an identical portion is identified in the memory, then the transformation step 123 may be replaced by a use of the number 222 encoded on at least one byte corresponding to said stored portion.

The method 100 according to the invention also includes a step 130 for encoding the set 211 of numbers so as to generate a request 231 including at least one addressing command. This encoding step can be performed by an encoding module 330 associated with the request generation device according to the invention.

The request 231 is preferably a request in a computer language. It allows the generation of a list of a direct route access path, or addressing command, from said numbers encoded on at least one byte.

The access path list is preferably generated in a computer language allowing a "system manager" to directly access the ports defined in the formal (non-computer) language instruction made by a user. Advantageously, the request includes an addressing command per port to be monitored and said addressing command is a command of the direct route path type. Such encoding may for example rely on a software library including a routine collection capable of generating a request 231 including a plurality of addressing commands, each pointing towards one of the ports defined in the formal language instruction.

Thus, the method may comprise encoding 130 the set 221 of numbers encoded on at least one byte so as to generate the request 231 via a dedicated script that can be written in a wide variety of computer languages.

FIGS. 3A and 3B show examples of such requests 231. By convention, it is accepted that a direct route path always starts with the identifier 0. In addition, for clarity reasons, it is assumed here that each node comprises only one input and output port with the reference 1.

The information for establishing the links between switch ports and between switch and node ports is typically stored in routing tables and/or in a configuration database of the IT infrastructure. Here, the use of a direct route path allows to dispense with the use of such routing tables.

The different steps of the method according to the invention can be stored on one or more configuration files which a request generation device according to the invention could access. The one or more configuration files may be encoded in a large number of programming languages. For example, they are C language-encoded.

According to another aspect, the invention relates to a request generating device 300, configured to generate a request, from a formal language instruction defining a set of ports of an interconnection network. The interconnection network generally includes a plurality of computing nodes where each node includes a plurality of ports for connecting them to each other and to switches. The generated request has the particularity of including an addressing command 232 for each one of the ports defined in the formal language instruction. The request generator 300 is more particularly an addressing command generator.

As shown in FIG. 1, the request generating device 300 includes a communication module 310 able to receive a formal language instruction defining a set of ports. The communication module 310 is configured to receive and transmit information to remote systems such as tablets, phones, computers or servers and can thus enable the communication between the device 300 and a remote terminal, including a client 600. The communication module 310 allows to transmit the data on at least one communication network and may comprise a wired or wireless communication. The interaction may involve an application software used by the operator to interact with the system according to the invention. The application software may include a graphical interface for facilitating an interaction with an operator. An operator can then act on the remote terminal so as to generate an instruction that can be implemented by the device 300. Similarly, the device 300 is able to receive the instruction 211 from a client device and to send the request 231 to a system 400 for monitoring an interconnection network.

The request generating device 300 also includes a processing module 320 able to process the formal language instruction 211 so as to generate a set 221 of numbers 222 encoded on at least one byte, as well as an encoding module 330 able to encode the set of numbers encoded on at least one byte so as to generate a request including an addressing command for each one of the ports of the set of ports.

These modules 310, 320, 330 are separate in FIG. 1, but the invention may provide various types of arrangement, for example a single module cumulating all the functions described here. Similarly, these means may be divided into several electronic boards or gathered on a single electronic board.

When an action is taken to a device or a module, it is actually performed by a microprocessor of the device or module controlled by instruction codes stored in a memory.

If an action is taken to an application, it is actually performed by a microprocessor of the device in a memory of which the instruction codes corresponding to the application are stored. When a device or module transmits or receives a message, this message is sent or received by a communication interface. The memories mentioned in this invention may correspond to a random access memory and/or a mass memory. The mass memory may be a medium such as a memory card, or a hard disk hosted by a remote server.

In another aspect, the invention relates to a system 400 for monitoring an interconnection network including a request generating device according to the invention, as well as a method implementing this system. Preferably, the monitoring method according to the invention is dedicated to monitoring hardware failures. It thus allows to follow hardware information that can be transmitted by the ports of the switches of the interconnection network.

A monitoring method according to the invention is shown in FIG. 5. It comprises the following steps:
- receiving 510 a formal language instruction 211 defining a set 11 of ports corresponding to a restricted perimeter of the interconnection network,
- generating 520, from the formal language instruction 211, a request 231 including an addressing command for each one of the ports 10 defined in the formal language instruction 211,
- transmitting 530 the request 231 to a restricted perimeter monitoring module 700 able to receive hardware statuses of the set 11 of ports of the restricted monitoring perimeter,
- requesting 540 hardware statuses by the restricted perimeter monitoring module 700 with the ports corresponding to the restricted perimeter of the interconnection network,
- receiving 550 the hardware status values by the monitoring module 700, and
- storing 560 the hardware status values by the monitoring module 700.

Preferably, storing 560 the hardware status values corresponds to storing the hardware status values that exceeded a predetermined maximum threshold. Thus, there is no memory clutter with less relevant information.

The method may also include a step for transmitting the hardware status values stored by the monitoring module.

In the embodiment described in FIG. 5, the monitoring method is implemented in parallel by three restricted perimeter monitoring modules 700. This allows to lighten the load supported by each one of the monitoring modules 700 and thus to improve the performance of the method.

When several restricted perimeter monitoring modules are implemented, the method for monitoring an interconnection network according to the invention may further comprise receiving hardware status values from a plurality of restricted perimeter monitoring modules. As mentioned above, advantageously, only the values of hardware statuses that exceeded a predetermined maximum threshold are received 570 and stored 580. Receiving the hardware status values, as well as the subsequent steps, can be preferably supported by the monitoring system and more particularly by a dedicated processing module.

The hardware status values, preferably those that exceeded a predetermined maximum threshold, are aggregated 590 so as to obtain an overall view of the interconnection network. The hardware status values may be advantageously selected from: the state of the power supply, the board voltage values, the internal temperatures (chips, controller, fan, board, etc.), the state of the fan, the environmental and operational data of the display, the software versions of the switch, the cabling errors, the congestion levels, the identifier errors (LID . . . ), the connection errors, the power supply errors, the throughput alerts.

Thus, the methods and hardware according to the invention allow to quickly segment a set of ports of an interconnection network so as, for example, to set up a perimeter monitoring of said interconnection network. In addition, the thus-developed monitoring method has improved performance compared with conventional systems of routing tables or using partition keys.

All of these advantages therefore contribute to reducing the monitoring processing times, especially the hardware monitoring, of an interconnection network and also to reducing the volumes of data managed.

The invention claimed is:

1. A method for monitoring an interconnection network implementing a request generating device, said method comprising:
    receiving a formal language instruction defining a set of ports corresponding to a restricted perimeter of the interconnection network,
    generating, from the formal language instruction, a request including an addressing command for each one of the set of ports defined in the formal language instruction, the request encoding a set of numbers encoded on at least one byte, each number of said set of numbers encoded on said at least one byte including position bits, each one of the position bits allowing identification of a port and at least one authorization bit, the at least one authorization bit allowing to define access rights on the set of ports,
    transmitting the request to a restricted perimeter monitoring module able to receive hardware statuses of the set of ports of the restricted perimeter,
    requesting hardware status values by the restricted perimeter monitoring module with the set of ports corresponding to the restricted perimeter of the interconnection network,
    receiving the hardware status values by the restricted perimeter monitoring module, and
    storing the hardware status values by the restricted perimeter monitoring module.

2. The method for monitoring an interconnection network according to claim 1, further comprising:
    receiving additional hardware status values from a plurality of additional restricted perimeter monitoring modules,
    storing the additional hardware status values, and
    aggregating the additional hardware status values from the plurality of additional restricted perimeter monitoring modules.

3. The method for monitoring an interconnection network according to claim 1, wherein at least one of the hardware status values is selected from: a state of a power supply, board voltage values, internal temperatures, a state of a fan, environmental and operational data of a display, and software versions of a switch.

4. The method for monitoring an interconnection network according to claim 1, wherein said method for monitoring is implemented in parallel by three restricted perimeter monitoring modules.

5. The method for monitoring an interconnection network according to claim 1, wherein the interconnection network includes a plurality of levels and the set of numbers encoded on said at least one byte includes at least one number encoded on said at least one byte for each level of the plurality of levels of the interconnection network.

6. The method for monitoring an interconnection network according to claim 1, wherein the set of numbers encoded on said at least one byte are numbers encoded on eight bytes.

7. The method for monitoring an interconnection network according to claim 1, wherein the set of numbers includes between two and sixteen numbers encoded on said at least one byte.

8. The method for monitoring an interconnection network according to claim 1, wherein the formal language instruction includes a plurality of numbers corresponding to numbers of ports of the interconnection network and symbols.

9. The method for monitoring an interconnection network according to claim 1, wherein a position bit of one of the position bits in a number of said set of numbers encoded on said at least one byte is indicative of a port number of a port of said set of ports, and a value of the position bit is indicative of whether said port is taken into account when establishing the request.

10. The method for monitoring an interconnection network according to claim 1, wherein values of the position bits allow definition of one or more associated ports which will be taken into account when establishing the request and a value of the at least one authorization bit allows definition of whether the one or more associated ports will be a subject of a destination by the addressing command or whether the one or more associated ports will only be traversed.

11. The method for monitoring an interconnection network according to claim 1, wherein the request generating device is configured to generate, from the formal language instruction defining the set of ports of the interconnection network, the request including the addressing command for each one of the set of ports defined in the formal language instruction, said request generating device comprising:
    a communication module configured to receive the formal language instruction defining the set of ports,
    a processing module, configured to process the formal language instruction to generate the set of numbers encoded on said at least one byte, and
    an encoding module, configured to encode the set of numbers encoded on said at least one byte to generate said request.

12. The method for monitoring an interconnection network according to claim 1, wherein the request generating device is configured to receive the formal language instruction from a client device and send the request to a system for monitoring the interconnection network.

* * * * *